Patented Jan. 20, 1953

2,626,279

UNITED STATES PATENT OFFICE 2,626,279

THIOLESTERS AND THEIR PREPARATION

Willie W. Crouch, Robert T. Werkman, and Robert J. Fanning, Bartlesville, Okla., assignors to Phillips Petroleum Company, a corporation of Delaware No Drawing. Application September 9, 1949, Serial No. 114,920

15 Claims. (Cl. 260—455)

This invention relates to novel thiolesters and to a method for preparing and using said thiolesters. In one aspect this invention relates to the reaction of a conjugated diolefin hydrocarbon with a monothio carboxylic acid and to the addition products thus-produced. In a specific embodiment this invention relates to the reaction of 1,3-butadiene and thioacetic acid to produce monothio and dithio acetate derivatives of 1,3-butadiene. In another aspect this invention relates to a novel process for producing mercaptan derivatives of unsaturated aliphatic hydrocarbons and dimercaptan derivatives of saturated aliphatic hydrocarbons. In another specific embodiment this invention relates to a novel process for producing mercaptan derivatives of butene and dimercaptan derivatives of butane.

Reactive organic compounds containing divalent sulfur, especially if bifunctional, have many important applications as such and as intermediates in producing other sulfur-containing compounds. Organic compounds containing divalent sulfur have found numerous applications in such fields as rubber vulcanization, lubricating oil additives, medicine, ore flotation and dyes. Also, recently developments in the field of high polymers have created a need for a source of alkyl dimercaptans and alkenyl mercaptans.

It is an object of this invention to provide a novel process for producing thiolesters.

It is another object of this invention to provide a process for reacting a conjugated diolefin hydrocarbon with a monothio carboxylic acid to form thiolesters.

It is another object of this invention to provide a process for reacting 1,3-butadiene with thioacetic acid to produce thiolesters.

It is another object of this invention to provide novel sulfur-containing compounds.

It is another object of this invention to provide novel addition products of a conjugated diolefin hydrocarbon and a monothio carboxylic acid.

It is another object of this invention to provide novel addition products of 1,3-butadiene and thioacetic acid.

It is another object of this invention to provide 2-butenyl-1-thiolacetate.

It is another object of this invention to provide butane-1,2-dithiolacetate and butane-1,3-dithiolacetate.

It is a further object of this invention to provide a novel process for producing mercaptan derivatives of unsaturated aliphatic hydrocarbons.

It is a further object of this invention to provide a novel process for producing dimercaptan derivatives of saturated aliphatic hydrocarbons.

Additional and further objects of this invention will be readily manifest from our disclosure hereinbelow.

We have found that novel thiolesters can be produced by the novel reaction of a conjugated diolefin hydrocarbon with a monothio carboxylic acid. The thiolesters are addition products of the two reactants, and they may be readily used to produce other compounds, such as the mercaptan derivatives.

The conjugated diolefin hydrocarbons for our process have the general structural formula

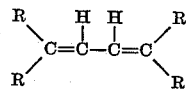

wherein each of the R's is either hydrogen or a hydrocarbon radical selected from the group consisting of alkyl, cycloalkyl and aryl groups. Typical hydrocarbon radicals are methyl, ethyl, propyl, butyl, pentyl, hexyl, cyclopropyl, cyclobutyl, cyclopentyl, cyclohexyl, phenyl, benzyl, tolyl, xylyl and the like. The diolefin hydrocarbon should contain no more than 12 carbon atoms per molecule.

The monothio carboxylic acids for our process have the general formula

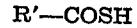

R'—COSH wherein R' represents an alkyl, cycloalkyl or aryl group. Typical examples of R' are methyl, ethyl, propyl, butyl, pentyl, hexyl, cyclopropyl, cyclobutyl, cyclopentyl, cyclohexyl, phenyl, benzyl, tolyl, xylyl and the like. R' is a hydrocarbon radical containing no more than 8 carbon atoms.

For the sake of simplicity and for ease in describing and understanding our invention, we will describe our process by using 1,3-butadiene and thioacetic acid as typical reactants, but the scope of our invention should not be limited to these two reactants. Those skilled in the art will readily perceive from the generic concept of our invention that various combinations of reactants may be employed.

In a specific embodiment of our process thioacetic acid is reacted with 1,3-butadiene, and a product of the reaction is 2-butenyl-1-thiolacetate in accordance with the following equation (A) 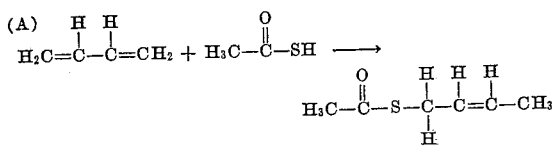

and the product thus-formed may be isolated as such by any suitable method, such as distillation. Other products of our process, viz. butane-1,2-dithiolacetate and butane-1,3-dithiolacetate, are produced in accordance with the following equation (B) 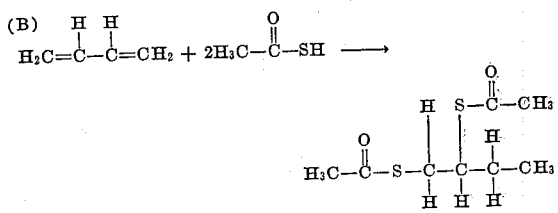

or

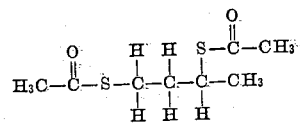

These latter products may also be separated from the reaction mixture by suitable methods, such as distillation. Thus, the products of our process are mono- and dithiolester derivatives of unsaturated and saturated hydrocarbons, respectively.

It is known that thioacetic acid reacts with monoolefins and thereby adds to the double bond of the olefin to produce thiolacetates. Our reaction of thioacetic acid with conjugated diolefins differs from this reaction since the reaction proceeds in an unexpected manner. Such was found to be the case in the reaction of thioacetic acid with 1,3-butadiene. Instead of proceeding rapidly to butane-1,4-dithiolacetate, as would be predicted on the basis of the reaction of thioacetic acid with monoolefins, we have found that the reaction proceeds slowly at elevated temperature in the presence of a catalyst to 2-butenyl-1-thiolacetate, butane-1,2-dithiolacetate and butane-1,3-dithiolacetate.

The reactants for our process are employed in molar ratios of monothio carboxylic acid to diolefin hydrocarbon of 0.5 to 5.0, preferably 0.8 to 3.5. Also, to effect the reactions set forth above we employ a temperature within the range of 30 to 140° C., preferably 45 to 110° C., and the pressure is usually sufficient to maintain a liquid phase reaction.

The reaction is ordinarily effected in the presence of a catalyst for the reaction which is generally oxygen or an oxygen-containing gas, such as air, or a peroxide. Examples of peroxides that we have found effective for the reaction are benzoyl peroxides, diisopropyl hydroperoxide, sec.-butyl benzene hydroperoxide, p-cymene hydroperoxide, tert.-butyl cumene hydroperoxide and tert.-butyl hydroperoxide. We prefer to effect the reaction with the last-named catalyst. When a peroxide catalyst is used, from 0.2 to 5.0, preferably 1.0 to 3.0, parts of catalyst by weight per 100 parts of total reactants are employed. We have also found it desirable to add the catalyst to the reaction in increments. By this method higher conversions to the desired products are obtained than when adding the same total amount of catalyst at the beginning of the reaction. For example, the total quantity of catalyst to be employed may be divided into from 5 to 25 substantially equal portions which are introduced to the reaction during the initial 0.5 to 10 hours of the total reaction time. This method of operation and the results obtained therefrom will be shown in the specific examples below.

To effect our process, suitable solvents inert to the reactants and reaction products may be employed. Normally liquid, saturated, aliphatic hydrocarbons, such as hexane, heptane, octane and the like, may be used. Also, aromatic hydrocarbons, such as benzene, may similarly be used. The reactants in our process are contacted for a period of time ranging from 0.5 to 30 hours and higher to obtain the products set forth in the equations hereinabove. The products named in the above equations are produced at the ranges of reaction conditions described herein. However, within the expressed ranges of reaction conditions there are conditions which tend to encourage the production of the dithiolester in preference to the mono derivative and vice versa. For example, the higher reaction temperatures, the higher molar ratios of acid to diolefin hydrocarbon, the higher contact times, and the higher catalyst concentrations, each tends to produce dithiolesters in our process, but low reaction temperatures, short contact times, lower molar ratios of acid to diolefin hydrocarbon, and lower catalyst concentrations each promotes the production of the mono addition product.

The thiolesters produced in accordance with our process are useful for conversion to the corresponding mercaptans by hydrolysis, for example, with an aqueous alkaline solution followed by treatment with an acid, such as a mineral acid. For instance, using the butane-1,2-dithiolacetate produced in Equation B above, the following equations illustrate the preparation of mercaptans:

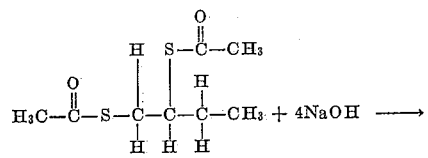

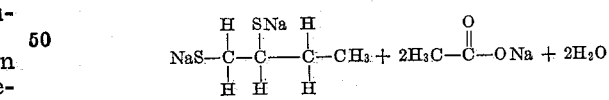

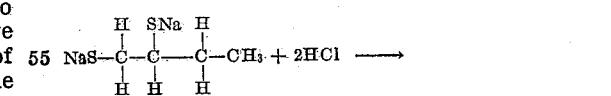

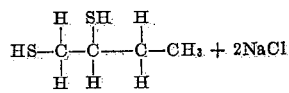

By similar reactions the product resulting from Equation A above may be employed to produce 1-mercapto-2-butene.

The following examples are illustrative of our process.

*Example I*

Thioacetic acid, liquid 1,3-butadiene and n-heptane solvent were charged to a reactor in the following amounts:

| | Grams |
|---|---|
| Thioacetic acid | 27 |
| 1,3-butadiene | 20 |
| n-Heptane | 34 |

The reactor charge was warmed to 30° C., and 0.1 gram portions of tert.-butyl hydroperoxide were added to the reaction mixture every 10 minutes for 100 minutes. During the reaction period the temperature of the reactants gradually rose to a maximum of 95° C. The n-heptane solvent and 9.6 grams of unreacted thioacetic acid were distilled from the reaction mixture at atmospheric pressure, after which 27.5 grams of 2-butenyl-1-thiolacetate, boiling at 73° C. at 25 mm. pressure, were recovered, representing a yield of 92.6 per cent of theory based on thioacetic acid. Analysis showed that this product contained 24.44 weight per cent sulfur, had a specific gravity, $d_4^{20}$, of 0.9811 and refractive index, $n_D^{20}$, of 1.4868.

Further proof of the structure of the product was obtained by preparing the corresponding mercaptan by hydrolysis. Fifty-one parts by weight of the product was treated with 208 parts of a 20 per cent caustic solution at a temperature of about 70° C. for a period of two hours. This material was acidified with sulfuric acid, and it was extracted with two 100 ml. portions of ether. The ether soluble material was then dried with sodium sulfate and fractionated at atmospheric pressure. The hydrolysis product boiled at 99 to 101° C. The specific gravity, $d_4^{20}$, was 0.884. Values given in the literature, Von Braun and Plate, Ber. 67B, 281-5 (1934), are a boiling point of 99 to 101° C. and a specific gravity $d_4^{23}$, of 0.883 for 1-mercapto-2-butene.

*Example II*

Thioacetic acid and 1,3-butadiene were reacted according to the following recipe:

| | Grams |
|---|---|
| Thioacetic acid | 63 |
| 1,3-butadiene | 15 |
| Tert.-butyl hydroperoxide | 1.5 |

The thioacetic acid and the 1,3-butadiene were charged to the reactor and heated to a temperature of about 75° C. The catalyst was added in 0.1 gram portions over a period of 6 hours. The reaction mixture was allowed to stand for 16 hours additional with no heat being supplied. Fifty grams of a mixture of butane-1,2-dithiolacetate and butane-1,3-dithiolacetate was recovered by distillation. This recovery represents a conversion of 1,3-butadiene to butane dithiolacetates of about 88 per cent.

*Example III*

Thioacetic acid and 1,3-butadiene were reacted in an autoclave according to the following recipe:

| | Grams |
|---|---|
| Thioacetic acid | 25 |
| 1,3-butadiene | 10 |
| Tert.-butyl hydroperoxide | 1 |

The reaction was allowed to proceed at a temperature of about 30° C. for 15 hours. At the end of this time the product was separated. 17.3 grams of 2-butenyl-1-thiolacetate were recovered, representing a conversion of 1,3-butadiene to 2-butenyl-1-thiolacetate of 72.0 per cent.

*Example IV*

A series of reaction was carried out using the following recipe and various catalysts.

| | Grams |
|---|---|
| Thioacetic acid | 27 |
| 1,3-butadiene | 20 |
| n-Heptane | 34 |
| Catalyst | 0.1 |

It will be noted that much lower catalyst concentrations were employed here than in previous examples. The thioacetic acid, 1,3-butadiene, n-heptane, and one-half the catalyst were charged to the reactor and heated to 60° C. The reaction was carried out for 18 to 19 hours in each case. At an intermediate point in the reaction the other half of the catalyst was added. The various catalysts employed together with the conversions are given in the table.

| Catalyst: | Per cent conversion to 2-butenyl-1-thiolacetate |
|---|---|
| Diisopropyl hydroperoxide | 8.6 |
| Sec.-butyl benzene hydroperoxide | 6.5 |
| p-Cymene hydroperoxide | 6.5 |
| Tert.-butyl cumene hydroperoxide | 6.0 |

By varying the reaction conditions, such as by increasing the catalyst concentrations, increased yields of product could have been obtained.

From the foregoing discussion and description of our invention, numerous modifications within the scope of our invention will be apparent to those skilled in the art.

We claim:

1. The process which comprises reacting a monothio carboxylic acid with a diolefinic hydrocarbon containing not more than 12 carbon atoms in the molecule and characterized by the structural formula

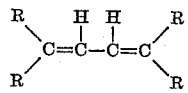

wherein each R is a radical selected from the group consisting of hydrogen, alkyl, cycloalkyl and aryl, to produce an addition product thereof, and recovering a thiolester selected from the group consisting a alkenyl thiolesters resulting from the 1,4 addition of one mol of said acid to one mol of said hydrocarbon and dithiolester addition products of one mol of said acid and one mol of said alkenyl thiolesters as a product of the reaction.

2. A process according to claim 1 wherein the monothio carboxylic acid has the general formula R'COSH wherein R' is a hydrocarbon radical containing no more than 8 carbon atoms.

3. A process according to claim 1 wherein the molar ratio of acid to hydrocarbon is within the range of 0.5 to 5.0.

4. A process according to claim 1 wherein the reactants are contacted at a temperature within the range of 30 to 140° C.

5. A process according to claim 1 wherein the reactants are contacted in the presence of a peroxidic catalyst in a concentration of 0.2 to 5.0 parts by weight of catalyst per 100 parts of reactants.

6. A process according to claim 5 wherein the catalyst is added to the reaction in increments.

7. The process which comprises reacting a monothio carboxylic acid having the formula R'COSH wherein R' is a hydrocarbon radical containing no more than 8 carbon atoms with a diolefinic hydrocarbon containing no more than 12 carbon atoms per molecule and characterized by the structural formula

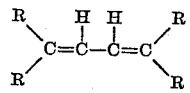

wherein each R is a radical selected from the group consisting of hydrogen, alkyl, cycloalkyl and aryl, in the presence of a catalyst selected from the group consisting of oxygen-containing gases and peroxides to form an addition product of the reactants, and recovering an alkenyl thiolester resulting from the 1,4 addition of one mol of said acid to one mol of said hydrocarbon as a product of the reaction.

8. A process according to claim 7 wherein the monothio carboxylic acid is thioacetic acid, wherein the hydrocarbon is butadiene-1,3 and wherein the thiolester recovered is 2-butenyl-1-thiolacetate.

9. The process which comprises reacting a monothio carboxylic acid having the formula R'COSH wherein R' is a hydrocarbon radical containing no more than 8 carbon atoms with a diolefinic hydrocarbon containing no more than 12 carbon atoms per molecule and characterized by the structural formula

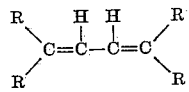

wherein each R is a radical selected from the group consisting of hydrogen, alkyl, cycloalkyl and aryl, in the presence of a catalyst selected from the group consisting of oxygen-containing gases and peroxides to form an addition product of the reactants, and recovering a dithiolester selected from the group consisting of 1,2 and 1,3 dithiolesters as a product of the reaction.

10. A process according to claim 9 wherein the monothio carboxylic acid is thioacetic acid, wherein the hydrocarbon is butadiene-1,3 and wherein the diethiolesters recovered are butane-1,2-dithiolacetate and butane-1,3-dithiolacetate.

11. As a composition of matter, butane-1,2-dithiolacetate.

12. As a composition of matter, butane-1,3-dithiolacetate.

13. The process which comprises reacting a monothio carboxylic acid with a diolefinic hydrocarbon containing not more than 12 carbon atoms in the molecule and characterized by the structural formula

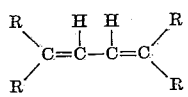

wherein each R is a radical selected from the group consisting of hydrogen, alkyl, cycloalkyl and aryl to form an alkenyl thiolester resulting from the 1,4 addition of one mol of said acid to one mol of said hydrocarbon, hydrolyzing the thiolester thus-produced with an aqueous alkaline solution, contacting the resulting product with a mineral acid, and recovering a mercaptan corresponding to said alkenyl thiolester as a product of the process.

14. A process according to claim 13 wherein the monothio carboxylic acid is thioacetic acid, wherein the hydrocarbon is butadiene-1,3 and wherein the meraptan is 1-mercapto-2-butene.

15. A dithiolester characterized by a structural formula selected from the group consisting of

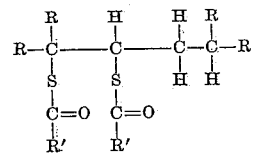

and

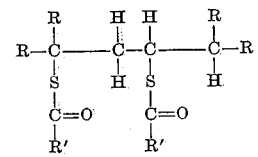

wherein, in each said structural formula R is a radical selected from the group consisting of H, alkyl, cycloalkyl and aryl, the total R's containing not more than 8 carbon atoms, and R' is a radical containing not more than 8 carbon atoms and is selected from the group consisting of alkyl, cycloalkyl and aryl.

WILLIE W. CROUCH.
ROBERT T. WERKMAN.
ROBERT J. FANNING.

REFERENCES CITED

The following references are of record in the file of this patent:

UNITED STATES PATENTS

| Number | Name | Date |
|---|---|---|
| 2,259,869 | Allen | Oct. 21, 1941 |

OTHER REFERENCES

Marvel et al., J. Am. Chem. Soc., vol. 70, pp. 993–998 (1940).

Cunneen, J. Chem. Soc. (1947), pp. 134–141.